(12) United States Patent
Ghiraldi

(10) Patent No.: US 9,182,765 B2
(45) Date of Patent: Nov. 10, 2015

(54) SYSTEM AND METHOD FOR AUTOMATICALLY ADJUSTING THE DOSAGE OF FEED PRODUCTS IN A LIVESTOCK FEED RECIPE

(75) Inventor: Andrea Ghiraldi, Poggio Rusco (IT)

(73) Assignee: DINAMICA GENERALE S.P.A., Poggio Rusco (Mantova) (IT)

( * ) Notice: Subject to any disclaimer, the term of this patent is extended or adjusted under 35 U.S.C. 154(b) by 578 days.

(21) Appl. No.: 13/410,111

(22) Filed: Mar. 1, 2012

(65) Prior Publication Data
US 2012/0287745 A1 Nov. 15, 2012

Related U.S. Application Data (60) Provisional application No. 61/448,303, filed on Mar. 2, 2011.

(51) Int. Cl.
*B01F 15/00* (2006.01)
*G05D 11/13* (2006.01)
*A01K 5/02* (2006.01)

(52) U.S. Cl.
CPC ............... *G05D 11/131* (2013.01); *A01K 5/02* (2013.01); *A01K 5/0275* (2013.01)

(58) Field of Classification Search
CPC ...... A01K 5/02; A01K 5/0275; G05D 11/131

USPC ........... 366/603, 140, 141, 142, 150.1, 151.1, 366/152.1; 119/902, 908, 72, 73
See application file for complete search history.

(56) References Cited

U.S. PATENT DOCUMENTS

| | | | | |
|---|---|---|---|---|
| 5,184,420 A | * | 2/1993 | Papadopoulos et al. | 47/62 N |
| 6,533,449 B1 | * | 3/2003 | Auad | 366/132 |

* cited by examiner

*Primary Examiner* — Tony G Soohoo
*Assistant Examiner* — Anshu Bhatia
(74) *Attorney, Agent, or Firm* — Volpe amd Koenig, P.C.

(57) ABSTRACT

A system to adjust a predetermined dosage of main livestock feed products in a predetermined feed recipe, which includes one or more feed dosages, each indicative of a predetermined amount of a corresponding main feed product in said feed recipe. The system includes a memory for storing the recipe, a meteorological monitoring system suitable for determining one or more meteorological parameters in the storage areas of the feed products and a processing unit, configured to: determine a first value indicative of the humidity in each feed product as a function of meteorological parameters associated with the related storage area, determine a differential value indicative of the difference between the first value and a second value indicative of a reference humidity of said feed product, and adjust the feed dosage associated with each feed product in the recipe based on the differential value of humidity in the main feed product.

10 Claims, 3 Drawing Sheets

Figure 1

| table 1 Feed Recipe | time t0 Sse%(t0) | Pobj(t0) | PSse(t0) |
|---|---|---|---|
| C1 | 50 | 100 | 50 |
| C2 | 50 | 200 | 10 |
| C3 | 50 | 300 | 150 |
| | | | 300 total dry substance to be loaded |

| | |
|---|---|
| Sse%(t0) | dry substance percentage at time t0 |
| Pobj(t0) | as-is weight |
| PSse(t0) | dry substance weight |

Figure 2

| table 2 execution | time t1 Sse%(t0) | Pobj(t0) | Sse%(t1) | Pobj(t1) | Pej(t1) | PSse(t1) |
|---|---|---|---|---|---|---|
| C1 | 50 | 100 | 60 | 83.3 | 100 | 60 |
| C2 | 50 | 200 | 60 | 166.7 | 180 | 108 |
| C3 | 50 | 300 | 60 | 250 | | |
| | | | | | | 168 |

| | | | | |
|---|---|---|---|---|
| 1 | INGREDIENT-LEVEL MODULATION | | =150/0.6 | =250 |
| 2 | RECIPE-LEVEL MODULATION | | =(300-168)/0.6 | =220 |

Figure 3

SYSTEM AND METHOD FOR AUTOMATICALLY ADJUSTING THE DOSAGE OF FEED PRODUCTS IN A LIVESTOCK FEED RECIPE

CROSS REFERENCE TO RELATED APPLICATION

This application claims the benefit of U.S. provisional application No. 61/448,303, filed Mar. 2, 2011, which is incorporated by reference as if fully set forth.

The present invention relates to a system and a method for adjusting the dosage of one or more feed products in a predetermined livestock feed recipe.

In particular, the present invention finds advantageous, but not exclusive application in the livestock sector for adjusting a feed recipe, for animals, comprising a plurality of feed products so as to control, for example, the loading of each of these feed products in a self-propelled unit, such as a mixer wagon or a chopper-mixer wagon for example, to which the following description makes explicit reference, but without loss of generality.

BACKGROUND OF THE INVENTION

The diet of livestock, of cattle for example, is normally specified by a specialist, typically a nutritionist. In detail, the nutritionist identifies, through laboratory analysis, a set of information regarding the chemical components and nutritional values, such as starch, proteins, dry substance etc., which characterize each feed product specified in the animal's diet and then determines, on the basis of the chemical components and nutritional values identified for each feed product and on the basis of the nutritional requirements of the animals deriving from their physical and productive conditions, the correct feed rations, in terms of the absolute weight of each feed product to be put in the feed diet.

At many livestock farms, the amount of each feed product and the preparation of the feed ration to be given to each animal is carried out by means of mixer wagon, inside which the various feed products are loaded, by appropriate subsystems provided on the mixer wagon or mechanical shovels or other loading systems mounted on motorized vehicles, according to the respective target weights specified in feed diet prepared by the nutritionist.

State-of-the-art mixer wagons are equipped with a weighing system, which comprises one or more load cells connected to the chassis and/or the bin of the mixer wagon to detect the weight of the feed products loaded in the bin and an electronic control unit connected to the load cells to measure, moment by moment, the weight of the feed product emptied by the mechanical shovel or whatever other loading system into the bin, so as to control that the weight of the loaded feed product reaches the respective predetermined target weight.

In detail, the electronic control unit comprises a memory for storing at least one recipe of feed products to load onto the mixer wagon, a processing and control module configured to control, on the basis of the recipe, the weight of the feed products as they are loaded onto the mixer wagon and a display unit to inform an operator of the measured weight, moment by moment, and of reaching the target weight in the feed recipe.

It often happens that the various feed products that form the recipe must be taken from different storage areas or deposits subjected to prolonged weather exposure, which is known to alter the percentages of the chemical components in feed products and, in consequence, significantly alter the nutritional value of feed products. Therefore, for the same weight of feed products given to an animal, the nutritional values effectively given can vary significantly with respect to those specified in the "theoretical" feed diet specified by the nutritionist.

In consequence, conditions of dietary imbalance can arise in the animal that can even harm the animal's physical conditions and that, in any case, can lead to a qualitative and quantitative deterioration of the products obtained from the animal (milk, meat, etc.). Nutritionists know this risk very well and therefore tend to give a diet able to satisfy the nutritional requirements of the animals even in the worst case by giving, in the majority of circumstances, a diet with an excess of nutritional elements that increase feed costs more than is effectively necessary and also increase the levels of nitrogen and phosphorus in the faeces.

It should be added that when an animal ingests an excessive quantity of proteins with respect to its needs, through its digestive cycle, the animal transforms the excess proteins into nitrogenous compounds that are expelled in the form of faeces: the resulting environmental impact is significant and obviously proportional to the number of animals subjected to a feed diet with excess proteins.

SUMMARY OF THE INVENTION

In order to overcome the above-stated technical drawbacks, the applicant has invented a system for automatically controlling the loading of feed products in a feed recipe into a self-propelled unit on the basis of the physicochemical characteristics of each feed product.

For example, Italian invention patent applications No. BO2010A000237, BO2004A000160 and BO2007A000461, filed by the applicant, describe a system comprising: a weighing device that measures the weight of the feed products loaded on the self-propelled unit, a loading device that loads each feed product forming the feed recipe from the related storage area onto the self-propelled unit, and a measuring unit that, for each feed product present in the respective storage area, measures a plurality of chemical and/or physical parameters by means of a spectrometer device or NIR apparatus configured to determine these chemical and/or physical parameters on the basis of the spectrophotometric response of the feed product in the so-called "near-infrared" (NIR) region.

In addition, the system provides for adjusting the target weights of the feed recipe based on the measured chemical and/or physical parameters, and controls the weight of the feed products to be loaded, as they are loaded onto feed product mixer unit, on the basis of the weight of the feed product detected by the weighing device and on the basis of the adjusted feed recipe.

Although the above-described system is extremely precise and efficient, the applicant has carried out an in-depth study with the objective of identifying a solution that enables specifically achieving the objective of providing a system configured to adjust the dosage of the feed products in the feed recipe based upon variations in the chemical components of the feed products caused by exposure of the feed products to the weather, and that is devoid of the spectrometer device in order to simplify the architecture of the system and so reduce its implementation costs.

According to the present invention, a system is provided to adjust a predetermined dosage of main livestock feed products in a predetermined feed recipe, said feed recipe comprising one or more feed dosages, each of which is indicative of a predetermined quantity/weight of a corresponding main feed product in said feed recipe, the system comprising: memory means suitable for storing said predetermined feed recipe; meteorological monitoring means suitable for determining one or more meteorological parameters in the storage areas of said main feed products; processing means configured to: determine a first value that is indicative of the humidity in each said main feed product as a function of the meteorological parameters associated with the related storage area, determine a differential value that is indicative of the difference between the first value and a second value that is indicative of a reference humidity of said main feed product, and adjust the feed dosage associated with each main feed product in said feed recipe on the basis of said differential value of humidity in the main feed product.

Preferably, the meteorological monitoring means comprise temperature measuring means configured to measure the temperature in the storage area of said main feed product, and/or means configured to measure the air pressure in the storage area of said main feed product, and/or atmospheric humidity measuring means operable to measure the humidity in the storage area of said main feed product, and/or speed measuring means operable to measure the wind speed in the storage area of said main feed product, and/or measuring means configured to measure the amount of rain/snow in the storage area of said main feed product.

Preferably, the meteorological monitoring means are contained in at least one meteorological monitoring station, installed in the storage area of the main feed product.

Preferably, the meteorological monitoring means comprise a communication system, the processing means being configured to provide the communication system with position data regarding the geographical position of the storage area in which said main food product is placed, the system further comprising a remote meteorological analysis unit configured to receive the position data from said communication system and to transmit the meteorological parameters based on the received environment data to said processing means, through said communication system.

Preferably, the processing means are configured to perform a statistical calculation that process a statistical curve/trend of the experimentally measured humidity values of each main feed product which are experimentally measured during variation of meteorological parameters of the main feed product's storage area, so as to be able to estimate the humidity in each main feed product based on the meteorological parameters detected by the meteorological monitoring means.

Preferably, the processing means are configured to perform a statistical calculation algorithm that develops the statistical trend of the variation in the experimentally measured weight/quantity of each main feed product as the humidity in the main feed product's storage area changes, so as to be able to determine the adjustments to make to the predetermined dosage specified in the feed recipe.

Preferably, the system comprises NIR means configured to determine the spectrum of electromagnetic radiation reflected and/or absorbed by each said main feed product, the processing means being configured to determine said second value, which is indicative of reference humidity of said main feed product, on the basis of the radiation spectrum detected by said NIR means and to store said reference humidity of said main feed product in said memory means.

Preferably, the processing means are configured to adjust feed recipe on the basis of the changes in each determined dosage and store the adjusted feed recipe in the memory means.

Preferably, the system comprises loading means operable to load the feed product in a self-propelled unit and weighing means configured to measure the weight of the main feed product loaded on the self-propelled unit, the processing means being configured to control the loading means according to the weight of the main feed product loaded and the dosage in the adjusted feed recipe.

Preferably, the processing means are configured to control, through said loading means, the weight of the feed products to be loaded, as they are loaded on the self-propelled unit, on the basis of the measured weight and on the basis of the adjusted feed recipe.

Preferably, the loading means and/or the weighing means are installed on the self-propelled unit.

Preferably, the loading means comprise a mechanical shovel, which is mounted on a motorized vehicle and able to pick up and load the feed product on the self-propelled unit.

Preferably, the weighing means are installed on the shovel.

Preferably, the system comprises electrical/electronic means suitable for adjusting an electrical quantity that is indicative of a resistance/conductance/impedance that depends on the humidity of the feed product, the processing means being configured to determine the humidity of the main feed product as a function of the electrical quantity.

Preferably, the electrical/electronic means are installed on said self-propelled unit.

Preferably, the electrical/electronic means are installed on the shovel.

Preferably, the electrical/electronic means are installed in the storage area in contact with the feed product.

According to the present invention, a method is also provided to adjust a predetermined dosage of main livestock feed products in a predetermined feed recipe, said feed recipe comprising one or more feed dosages, each of which is indicative of a predetermined amount/weight of a corresponding main feed product in said feed recipe, the method comprising the following steps of: storing said predetermined feed recipe in the memory means, determining one or more meteorological parameters in the storage areas of said main feed products, determining a first value that is indicative of the humidity in each said main feed product as a function of the meteorological parameters associated with the related storage area, determining a differential value that is indicative of the difference between the first value and a second value that is indicative of a reference humidity of said main feed product, and adjusting the feed dosage associated with each main feed product in said feed recipe on the basis of said differential value of humidity in the main feed product.

Preferably, the method comprises the step of determining the meteorological parameters through measuring means comprising: temperature measuring means configured to measure the temperature in the environment in which said main food product is placed, and/or means for measuring the air pressure in the environment in which said main food product is placed, and/or atmospheric humidity measuring means configured to measure the humidity in the environment in which said main food product is placed, and/or speed measuring means configured to measure the wind speed in the environment in which said main food product is placed, and/or measuring means configured to measure the amount of rain/snow in the environment in which said main food product is placed.

Preferably, the method comprises the step of performing a statistical calculation algorithm that process the statistical trend of the experimentally measured humidity values of each main feed product which are experimentally measured during variation of meteorological parameters of the main feed product's storage area, so as to be able to determine the changes to make to the predetermined dosage specified in the livestock feed recipe.

Preferably, the method comprises the step of implementing a statistical calculation algorithm that develops a statistical trend of the experimentally measured humidity values of each main feed product as the meteorological parameters of the main feed product's storage area change, so as to be able to estimate the humidity in each main feed product on the basis of the meteorological parameters detected by the meteorological monitoring means.

Preferably, the method comprises the step of determining the spectrum of electromagnetic radiation reflected and/or absorbed by each said main feed product, determining said second value that is indicative of a reference humidity of said main feed product on the basis of the radiation spectrum and storing said reference humidity of said main feed product in said memory means.

Preferably, the method comprises the steps of loading the feed product on a self-propelled unit, measuring the weight of the main feed product loaded on the self-propelled unit and controlling the loading of the feed product as a function of the weight of the loaded main feed product and the dosage in the modified feed recipe.

BRIEF DESCRIPTION OF THE DRAWINGS

The present invention will now be described with reference to the attached drawings, which illustrate a non-limitative embodiment, where.

DETAILED DESCRIPTION OF THE INVENTION

Figure 1:
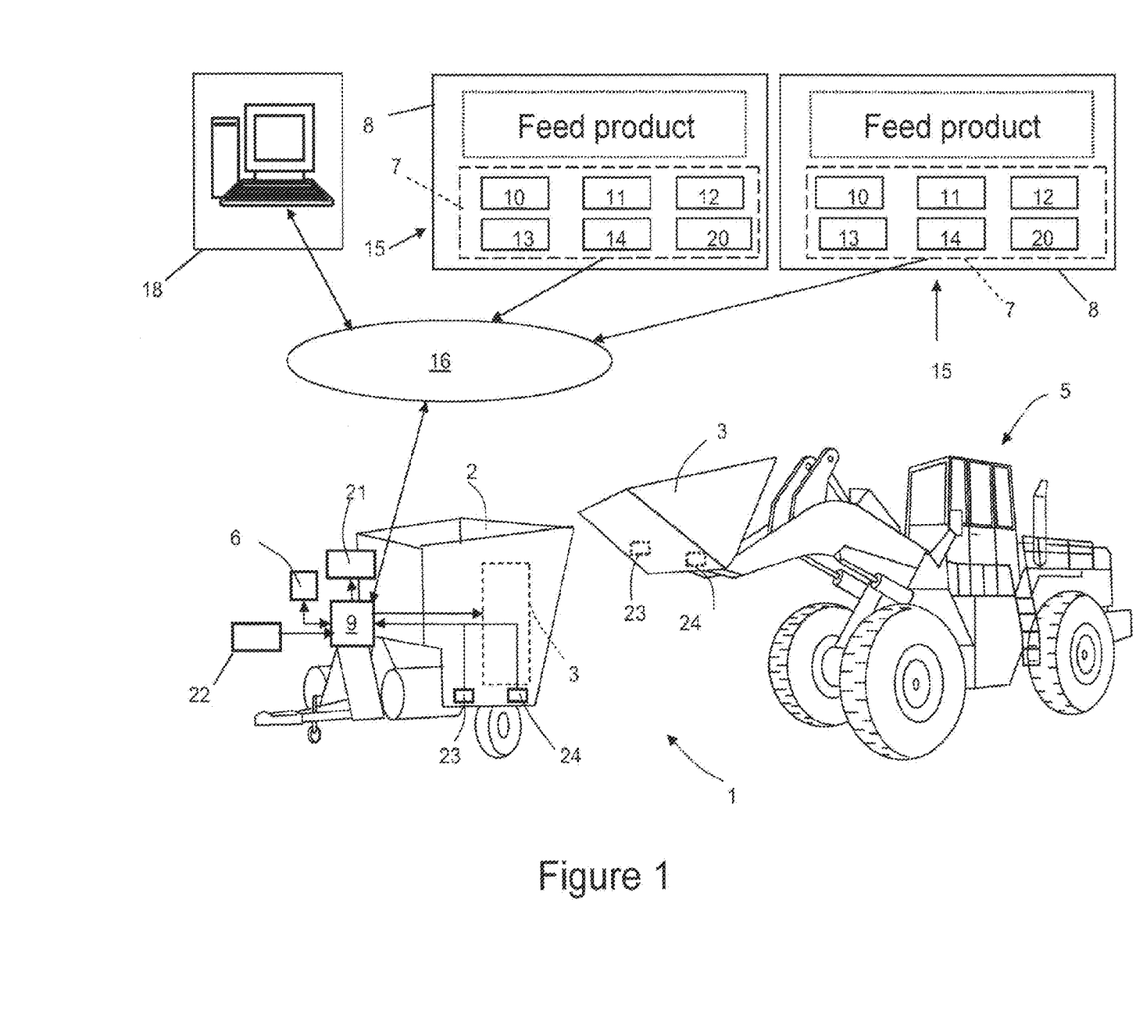
FIG. 1 schematically shows a system for adjusting the dosage of one or more feed products specified in a predetermined livestock feed recipe according to the principles of the present invention.

With reference to FIG. 1, reference numeral 1 indicates a system, in its entirety, for adjusting a predetermined dosage of main livestock feed products in a predetermined feed recipe.

The feed recipe comprises one or more feed dosages, each of which is indicative of a target quantity/weight for a corresponding main feed product. In other words, in the following, feed dosage will be intended as a value indicative of the target weight/quantity of the main feed product, or the target weight/quantity percentage of the main feed product with respect to the overall weight of the final feed product, or rather of the feed product recipe comprising all of the feed products specified in the feed recipe.

In greater detail, the feed recipe comprises a list of the feed products to be loaded on a self-propelled unit 2 (shown in FIG. 2) and, for each feed product, a respective target weight to be reached by loading the main feed product on the self-propelled unit 2. The list of feed products in the recipe comprises, for example, one or more of the following feed products: corn silage, hay, high moisture corn, alfalfa hay, grass silage, soybean flour, etc. The chemical and/or physical parameters for each feed product include the percentage of water in the feed product. The step of adjusting the feed recipe based on the measured values of the chemical and/or physical parameters corrects the target weight of each feed product as a function of the respective measured water percentage value, henceforth indicated as "humidity".

With reference to FIG. 1, the self-propelled unit 2 comprise a mixer wagon, or a chopper-mixer wagon, or any other type of wagon for collecting similar livestock feed products. The loading of each feed product on the self-propelled unit can be performed by a loading unit 3, for example a harvester/loader cutter or similar equipment installed directly on the self-propelled unit.

According to a different embodiment, the loading unit 3 comprises a mechanical shovel 4 mounted on a motorized vehicle 5, for example a tractor.

In the example shown in FIG. 1, the system 1 comprises a memory device 6 containing at least one predetermined feed recipe, i.e. having a respective predetermined dosage for each main feed product.

The system 1 also comprises a meteorological monitoring system 7 able to determine one or more meteorological parameters in the storage areas 8 of the main feed products.

The system 1 also comprises a processing unit 9, for example a computer or microprocessor, which is configured to: determine a first value that is indicative of the humidity in each main feed product as a function of the meteorological parameters associated with the related storage area 8, determine a differential value of humidity that is indicative of the difference between the first value determined by the previous calculation and a second value that is indicative of the reference humidity associated with the main feed product, and adjust the feed dosage associated with each main feed product specified in the feed recipe on the basis of the differential value of humidity in the same main feed product.

According to a preferred embodiment, the meteorological monitoring system 7 comprises: a temperature measurement device 10 configured to measure the temperature in the storage area 8 of each main feed product, and/or an air pressure measurement device 11 configured to measure the air pressure in the storage area 8 of each main feed product, and/or an atmospheric humidity measuring device 12 configured to measure the humidity in the storage area 8 of each main feed product, and/or a speed measurement device 13 configured to measure the speed of the wind in the storage area 8 of each main feed product, and/or a measurement device 14 configured to measure the amount of rain/snow in the storage area of each main feed product.

Preferably, the temperature measurement device 10, and/or the air pressure measurement device 11, and/or the atmospheric humidity measuring device 12, and/or the wind speed measurement device 13, and/or the rain/snow measurement device 14 can be comprised in one or more meteorological monitoring stations 15, each of which is installed in a storage area 8 of a main feed product.

The meteorological parameters determined by the meteorological monitoring station 15, namely temperature, pressure, humidity, wind speed and the amount of rain/snow measured in the storage area 8, may be communicated to the processing unit 9 by means of a communication system 16, such as a telephone network, or the Internet, or a wireless communication system or any other similarly known communication system.

According to a different possible embodiment, the meteorological parameters associated with the storage areas 8 of the feed products can be provided to the processing unit 9 by means of a meteorological monitoring system 7 comprising a remote meteorological analysis unit 18 hosting an Internet site for meteorological monitoring services. For example, the remote meteorological analysis unit 18 could be capable of cooperating with a satellite system (not shown) in a known manner to monitor the weather conditions in different geographical areas and process them to provide the meteorological parameters.

According to one possible embodiment, the meteorological monitoring system 7 is configured to store the meteorological parameters measured over a certain time interval, for example a predetermined number of days, so as to provide them to the processing unit 9 at each time interval. In other words, the meteorological data supplied to the processing unit 9 have a log of the weather conditions for "n" days before (amount of rain/snow, temperature and pressure).

The system 1 may also comprise a localization system 20, for example GPS modules installed in the storage areas 8 of the feed products to determine the positions of the latter, while the processing unit 9 handles transmitting, via the communication system 16, a request containing the geographical position of each storage area 8 to the remote meteorological analysis unit 18, so as to receive the meteorological parameters from the latter. According to one possible embodiment, the positions of the storage areas 8 may be stored in the memory device 6 and, consequently, in this case the system 1 does not have a localization system 20.

Instead, with regard to the reference humidity associated with the main feed product, this may correspond to a set or estimated or measured value stored in the memory device 6, at a time t0 prior to time t1 when the humidity of the feed product as a function of the meteorological parameters associated with the storage area is determined.

In particular, at time t0, the reference humidity can be stored in the memory device 6 by the user, through a user interface 21, on the basis of previously calculated laboratory data.

According to a different possible embodiment, at time t0, the reference humidity can be stored in the memory device 6 by the processing unit 9, on the basis of a direct measurement carried out by means of a NIR spectrometer device 22. For this purpose, the processing unit 9 can be configured to cooperate with the NIR spectrometer device 22 to receive values from the latter indicative of the spectrum of electromagnetic radiation reflected and/or absorbed by said main feed product, so as to determine the humidity of the main feed product as a function of the measured radiation spectrum.

According to a different possible embodiment, at time t0, the processing unit 9 can estimate the reference humidity as a function of the meteorological parameters associated with the storage area 8 of the main feed product. In other words, the reference humidity can be estimated indirectly by the processing unit 9 on the basis of the meteorological parameters detected in the storage area 8 at time t0.

According to a different embodiment, at time t0, the processing unit 9 may estimate the reference humidity on the basis of the humidity measured in each main feed product by means of the humidity sensors 24. For this purpose, the humidity sensors 24 may be of the inductive and/or capacitive and/or resistive type and may be installed, for example, in the storage area 8 and/or in the bin of the self-propelled unit and/or on the shovel 3. The humidity sensors 24 are configured to adjust an electrical quantity that is indicative of a resistance/conductance/impedance that depends on the humidity of said feed product.

With reference to FIG. 1, the processing unit 9 is further configured to perform a first algorithm to calculate the humidity in the feed products based on the meteorological parameters. When implemented by the processing unit 9, the statistical calculation algorithm is able to develop statistical curves or trends of the experimentally measured humidity values of each said main feed product as one or more meteorological parameters of the main feed product's storage area change, so as to be able to estimate the humidity in each main feed product on the basis of the meteorological parameters detected by the meteorological monitoring system 15. Preferably, the processing unit calculates the percentage of humidity absorbed by the recipe ingredient (feed product) on the basis of a series of input data: reference conditions at time t0, weather conditions (rainfall, temperature, pressure, etc.) between time t0 and a subsequent time t1, the type of feed product (physicochemical characteristics) and the previously loaded feed products in the recipe.

The processing unit 9 is further configured to implement a second calculation algorithm that determines the correction to be made to the target dosage, namely the target weight of each main feed product, as a function of the determined humidity differential.

According to one embodiment, the second algorithm calculates the correct weight as a function of the percentage of humidity absorbed by the material, based on the target weight provided by the recipe. The percentage of humidity absorbed by the material may be defined on a statistical basis. The system calculates the weight correction to be made for loads following the first one (material less exposed to the weather) according to the size of the storage area (material deposit). For example, a simulation of rainfall on a defined quantity of feed product and measurement of the amount of water absorbed could be provided. The percentage of absorbed water can be determined on the basis of predetermined conditions, such as, for example, the type material, initial humidity of the feed product, temperature, compactness of the feed product etc.

The processing unit 9 may be configured to adjust the target dosages/weights of the feed products in the feed recipe on the basis of the determined variations and store the adjusted feed recipe in the memory device 6.

The processing unit 9 can be configured to display the adjusted target weight for the user by means of the user interface 21.

Figure 2:
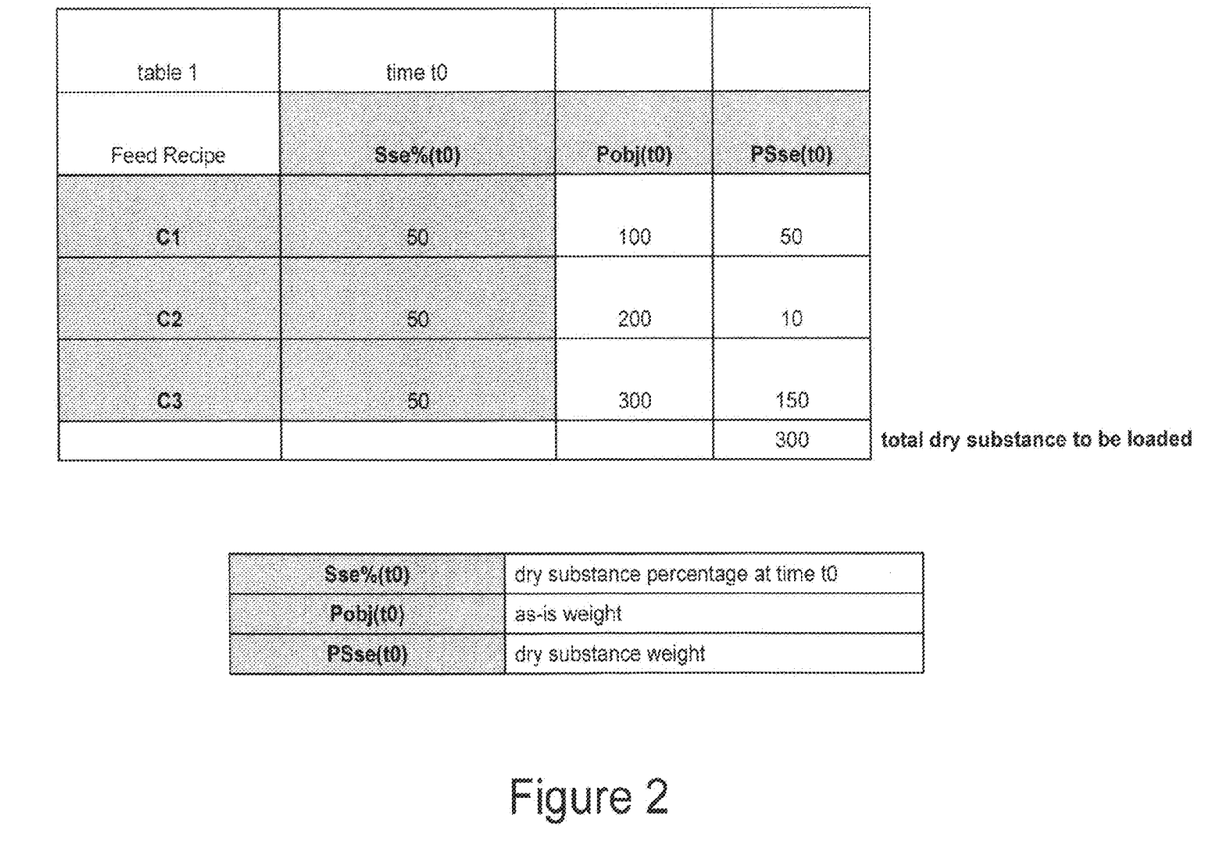
FIGS. 2 and 3 both show tables containing sample values calculated by means of the system shown in FIG. 1.

With reference to FIG. 2, in addition to being provided with the loading unit 3, the system also comprises a weighing system 23 configured to measure the weight of the main feed product loaded on the self-propelled unit 2.

Preferably, the weighing system 23 may comprise, for example, one or more load cells connected to chassis and/or the bin of the mixer wagon to detect the weight of the feed products loaded in the bin of the self-propelled unit 2.

According to a different embodiment, in which the loading unit 3 corresponds to a shovel, the weighing system 23 is installed directly on the shovel.

The processing unit 9 can also be configured to measure, moment by moment and by means of the weighing system 23, the weight of the main feed product loaded, or rather present on the self-propelled unit 2, and automatically control the loading unit 3, through known electromechanical actuation devices (not shown), based on the difference between the measured weight and the target weight of the main feed product in the modified feed recipe.

With reference to FIG. 1, the user interface 21 is configured to enable the user to provide the processing unit with dimensional data that is indicative of the overall dimensions of each storage area of the main feed product. In particular, the dimensional data may include partial dimensions of the storage area indicative of the portion of the area in which the main feed product is not covered, i.e. completely exposed to the weather.

The processing unit 9 may be configured to estimate the humidity of the main feed product as a function of the meteorological parameters and the dimensional data of the storage area 8.

According to a different embodiment, the processing unit 9 may be configured to estimate the humidity of the main feed product as a function of the meteorological parameters, and/or the dimensional data of the storage area 8, and/or the physicochemical parameters of the feed product, and/or the parameters associated with the method of storage of the feed product in the storage area.

Figure 3:
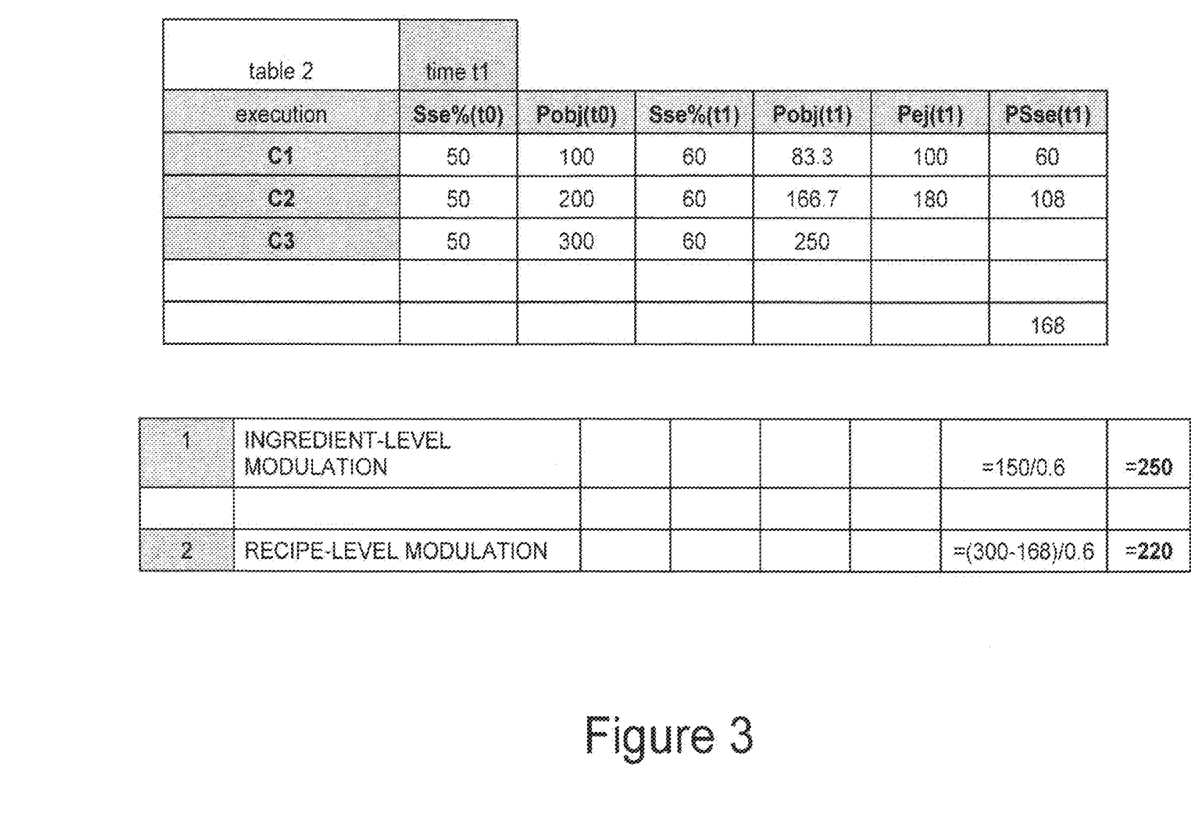

According to one possible embodiment, the processing unit 9 may be conveniently configured to perform a correction of the target weight of each feed product to be loaded, as specified in the feed recipe, according to a first operational correction strategy indicated in FIGS. 2 and 3 as "ingredient-level modulation", which is essentially based on the variation in the dry substance present in each feed product of the recipe.

It should be specified that the "dry substance" of a livestock feed product is intended as the net weight of the feed product in the absence of water/humidity and may be calculated by means of the following relation:

$$P_S = P_a(100-Um\%)/100 = P*S_{se}\%/100 \qquad a)$$

where $P_a$ is the overall weight of the feed product, $Um\%$ is the percentage of humidity in the feed product, $S_{se}\%$ is the percentage of dry substance present in the feed product and $P_s$ is the weight of dry substance.

When ingredient-level modulation is performed, the processing unit 9 performs the following operations for each feed product:

- determining, at time t1, after reference time t0, a first value that is indicative of the humidity in the main feed product as a function of the meteorological parameters associated with the related storage area;
- calculating the dry substance percentage $S_{se}\%(t1)$ of the main feed product as a function of the humidity; and
- calculating the new target weight Pobj(t1) of the feed product (the j'th one for example) through the following relation:

$$Pobj(t1) = (100*P_{sj}(t0))/S_{se}\%(t1). \qquad b)$$

where $P_{sj}(t0)$ is the weight of dry substance at time t0.

The processing unit 9 may be conveniently configured to display the target weight Pobj(t1) recalculated at time t1, via the user interface 21, or to control, moment by moment, the loading unit 3 on the basis of the weight measured by the weighing system 23, so as to load a quantity of feed product equal to the target weight Pobj(t1) onto the self-propelled unit.

FIG. 2 shows a possible calculation example in which the feed recipe comprises three feed products C1, C2 and C3 that, at time t0, have a dry substance percentage (indicated by $S_{se}\%(t0)$) of 50% each, target weights (indicated by Pobj(t0)) of 100, 200 and 300 respectively, and a target dry substance weight (indicated by $PS_{se}(t0)$) of $PS_{se}(t0) = (Pobj(t0)*S_{se}\%(t0))/100$, equal to 50, 100 and 150 respectively.

With reference to FIG. 3, it is assumed that at time t1, the dry substance percentage $S_{se}\%(t1)$ is 60% for each one of the feed products.

In this case, the processing unit updates the target weight Pobj(t1) of each feed product C1, C2 and C3 by means of above-described relation a), thereby determining the values 83.3, 166.7 and 250.

According to one possible embodiment, the processing unit 9 may be conveniently configured to perform correction of the target weight of each feed product to be loaded, as specified in the feed recipe, according to a second operational correction strategy indicated in FIG. 3 as "recipe-level modulation".

When recipe-level modulation is performed, the processing unit performs the following operations:

- determining, at time ti, after reference time t0, a first value that is indicative of the humidity in the main feed product as a function of the meteorological parameters associated with the related storage area;
- calculating the dry substance percentage $S_{se}\%(ti)$ of each of the j−1 feed products loaded as a function of the measured humidity and the weight Pei of each feed product; and
- calculating the effective weight of dry substance $PS_{se}(ti)$ in the feed product (for example, the j'th one) through the following relation:

$$PSsej-1(ti) = (Pej(ti)*S_{sej-1}\%(ti))/100. \qquad c)$$

Assuming that the feed product to be loaded corresponds to the j'th one, the processing unit 9 provides for:

calculating the total weight of the dry substance expected at time t0:

$$PT(t0) = \sum_{i=1}^{i=j} PSsei(t0) \qquad d)$$

adding the weights $PS_{se}(ti)$ of the dry substance of the j−1 feed products loaded at time ti:

$$PT_{j-1} = \sum_{i=1}^{i=j-1} PSsei(ti) \qquad e)$$

calculating the target weight of the j'th feed product through the following relation:

$$Pobj = ((PT(t0) - PT_{j-1})*100)/Ssej\%(ti) \qquad f)$$

The processing unit 9 may be configured to display the target weight Pobj(ti) recalculated at time t1, via the user interface 21, or to control, moment by moment, the loading unit 3 on the basis of the weight measured by weighing system 23, so as to load a quantity of feed on the self-propelled unit 2 product equal to the target weight Pobj(t1).

With reference to the example shown in FIGS. 2 and 3, it is assumed that the dry substance percentages $S_{se}\%(t1)$ and $S_{se}\%(t1')$ of the feed products C1 and C2 loaded at times t1 and t1' are both 60% rather than 50% as instead determined at time t0 and that the weight of ingredients C1 and C2 measured at times t1 and t1' are PC1(t1)=100 and PC2(t1')=180 respectively. In consequence, the weight of dry substance loaded for C1 and C2 is 60 and 108. In this case, the processing unit checks that the total weight of the dry substance expected at time t0 is $PT(t0) = \sum_{i=1}^{i=j-1} PSsei(t0) = 300$ and that the total weight of dry substance loaded is equal to $PT_{j-1} = \sum_{i=1}^{i=j-1} PSsei(ti) = 168$.

The processing unit 9 calculates the target weight of ingredient C3 by applying relation f):

$$PobjC3 = (300-168)*100/60 = 220.$$

The method for adjusting a predetermined dosage of main livestock feed products in a predetermined feed recipe embodied according to the present invention essentially provides for: storing the predetermined feed recipe in the memory device 6; determining one or more meteorological parameters in the storage areas 8 of the main feed products, determining a first value that is indicative of the humidity in each main feed product as a function of the meteorological parameters associated with the related storage area, determining a differential value that is indicative of the difference between the first value and a second value that is indicative of a reference humidity of said main feed product, and adjusting the feed dosage associated with each main feed product specified in the feed recipe on the basis of the differential value of humidity in the same main feed product.

The above-described system is extremely advantageous as it is able to adjust the dosage of the feed products in the feed recipe based on variations in the chemical components of the feed products caused by exposure of the feed products to the weather, without the need to use a spectrometer device, therefore simplifying its architecture and reducing implementation costs.

The system is also very quick: the calculation is actually performed in real time, without waiting for NIR analysis.

Finally, the system conveniently performs indirect and non-intrusive humidity analysis and does not require mechanical parts of the machines to be modified for the loader/mixer, as is instead required for the installation of NIR systems on the loading wagon/shovel.

In conclusion, it is understood that changes and modifications may be made to the system and method described and illustrated herein without however leaving the scope of protection of the present invention.

The invention claimed is:

1. A system (1) configured to adjust a predetermined dosage of main livestock feed products in a predetermined feed recipe; said feed recipe comprising one or more feed dosages, each of which is indicative of a predetermined amount/weight of a corresponding main feed product in said feed recipe; said system (1) comprising: a memory (6) configured to store said predetermined feed recipe; a meteorological monitoring system (7) configured to determine one or more meteorological parameters in storage areas (8) of said main feed products; a processor (9) configured to: determine a first value that is indicative of a humidity level in each said main feed product as a function of the meteorological parameters associated with the related storage area; determine a differential value that is indicative of a difference between the first value and a second value, that is indicative of a reference humidity of said main feed product; adjust the feed dosage associated with each main feed product in said feed recipe based on said differential value of humidity in the main feed product.

2. The system according to claim 1, wherein said meteorological monitoring system (7) comprises: a temperature measuring device (10) configured to measure a temperature in the storage area (8) of said main feed product, and/or a device configured to measure air pressure in the storage area (8) of said main feed product, and/or an atmospheric humidity measuring device (12) configured to measure the humidity in the storage area (8) of said main feed product, and/or a speed measuring device (13) configured to measure a wind speed in the storage area (8) of said main feed product, and/or a measuring device (14) configured to measure a amount of rain/snow in the storage area (8) of said main feed product.

3. The system according to claim 2, wherein said meteorological monitoring system (7) is contained in at least one meteorological monitoring station (15) installed in the storage area (8) of said main feed product.

4. The system according to claim 1, wherein said meteorological monitoring system (7) comprises a communication system (16), said processor (9) being configured to provide said communication system with position data regarding a geographical position of the storage area (8) in which said main food product is placed, the system (1) further comprising a remote meteorological analysis unit (18) configured to receive the position data from said communication system (16) and to transmit the meteorological parameters based on the received environment data to said processor (9), through said communication system (16).

5. The system according to claim 1, comprising a near-infrared region (NIR) device configured to determine a spectrum of electromagnetic radiation reflected and/or absorbed by each said main feed product, said processing means being configured to: determine said second value that is indicative of a reference humidity of said main feed product, on the basis of the radiation spectrum detected by said near-infrared region (NIR) device; and store said reference humidity of said main feed product in said memory means.

6. The system according to claim 1, comprising a loader (3) configured to load each said main feed product in a self-propelled unit (2) and a weighing device (23) configured to measure an effective weight of the main feed product that is found to be already loaded in said self-propelled unit (2), said processor (9) being configured to control the loader (3) as a function of the effective weight of the loaded main food product and based on the dosage of the feed product in said modified feed recipe.

7. The system according to claim 6, wherein said processor (9) is configured so that at a second time (t1), following a first reference time (t0), the processor (9) performs the steps of:
determining a first value that is indicative of the humidity in the main feed product as a function of the meteorological parameters associated with the related storage area;
calculating a dry substance percentage ($S_{se}$ %(t1)) of the main feed product as a function of the humidity;
calculating a correct target weight (Pobj(t1)) of the feed product through the following relation:

$$Pobj(t1)=((100*Ps_j(t0))/S_{se}\%(t1);\qquad\text{b)}$$

where Pobj(t1) is the weight of dry substance in the feed product at time (t1), while $S_{se}$ %(t1) is a dry substance percentage in the feed product at the second time; $P_{sj}(t0)$ is the weight of dry substance at time t0.

8. The system according to claim 6, wherein said processor (9) is configured such that at a second time (t1), following a first reference time (t0), the processor (9) performs the following operations:
determining a first value that is indicative of the humidity level in the main feed product as a function of the meteorological parameters associated with the related storage area;
calculating a dry substance percentage ($S_{se}$ %(t1)) of each of the j−1 feed products loaded as a function of the measured humidity and the weight (Pei) of each feed product;
calculating the effective weight of dry substance ($PS_{se}$(t1)) in the feed product through the following relation:

$$PSsej\text{-}1(ti)=(Pej\text{-}1(ti)*S_{sej\text{-}1}\%(ti))/100\qquad\text{c)}$$

calculating the total weight of dry substance of the first j feed products of the recipe provided for first time (t0):

$$PT(t0)=\Sigma_{i=1}^{i=j}PSsei(t0)\qquad\text{d)}$$

adding the weights ($PS_{se}$(t1)) of dry substance in the j−1 feed products loaded before the j'th feed product through the following relation:

$$PT_{j\text{-}1}=\Sigma_{i=1}^{i=kj\text{-}1}PSsei(ti)\qquad\text{e)}$$

calculating the target weight of the j'th feed product through the following relation:

$$Pobj=((PT(t0)-PT_{j\text{-}1})*100)/Ssej\ \%(ti).\qquad\text{f)}$$

9. The system according to claim 1, comprising an interface (21) through which a user provides dimensional data indicative of overall dimensions of said storage area (8) of a said main feed product and/or partial dimensions of the uncovered/covered storage area, said processor (9) being configured to: determine the humidity level in each said main feed product as a function of the meteorological parameters associated with the related storage area; carry out a correction on said humidity, on the basis of the dimensional data; adjust the feed dosage associated with each main feed product in said feed recipe on the basis of the correct humidity.

10. A livestock feed dosing system (1) configured to adjust a predetermined dosage of main livestock feed products in a predetermined feed recipe; said feed recipe comprising one or more feed dosages, each of which is indicative of a predetermined amount/weight of a corresponding livestock feed product in said feed recipe; the system comprising:
- a plurality of livestock feed product storage areas (8);
- a memory (6) configured to store said predetermined feed recipe;
- a meteorological monitoring system (7), associated with the livestock feed product storage area, configured to determine one or more meteorological parameters in the livestock feed product storage areas (8);
- a processor (9) configured to:
  - determine a first value that is indicative of a humidity level in each said livestock feed product as a function of the meteorological parameters associated with the related storage area;
  - determine a differential value that is indicative of a difference between the first value and a second value, that is indicative of a reference humidity of said main feed product;
  - adjust the feed dosage associated with each livestock feed product in said feed recipe based on said differential value of humidity in the livestock feed product; and
- a loading unit (2, 3) that receives the dosed livestock feed.

\* \* \* \* \*